(12) United States Patent
Ciccaglione et al.

(10) Patent No.: US 8,353,502 B2
(45) Date of Patent: *Jan. 15, 2013

(54) HINGED BASE FOR POSITIONING HEAVY COMPONENTS

(75) Inventors: Terry Michele Ciccaglione, Cold Spring, NY (US); Charles Carl Gange, Rhinebeck, NY (US); Sharon Terese Spaulding, Highland, NY (US); Todd D. Voltz, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 735 days.

This patent is subject to a terminal disclaimer.

(21) Appl. No.: 12/394,645

(22) Filed: Feb. 27, 2009

(65) Prior Publication Data

US 2010/0221091 A1    Sep. 2, 2010

(51) Int. Cl.
   *B25B 1/20*     (2006.01)
   *B64D 25/00*    (2006.01)
   *B65D 43/26*    (2006.01)
   *B65G 65/23*    (2006.01)

(52) U.S. Cl. ............ 269/43; 220/87.1; 220/263

(58) Field of Classification Search ............ 269/43; 220/88.1, 263, 88 R, 89, 87.1, 765, 773; D34/9

See application file for complete search history.

(56) References Cited

U.S. PATENT DOCUMENTS

| | | | | |
|---|---|---|---|---|
| 3,008,604 A | * | 11/1961 | Garner | 220/87.1 |
| 4,361,247 A | * | 11/1982 | Williams | 220/88.1 |
| 5,570,992 A | | 11/1996 | Lemelson | 414/744.3 |
| 5,672,044 A | | 9/1997 | Lemelson | 414/744.3 |

FOREIGN PATENT DOCUMENTS

| | | |
|---|---|---|
| CA | 1051195 | 3/1979 |
| JP | 2007/297830 A | 11/2007 |

OTHER PUBLICATIONS

Banks, Jerry, "The Future of Simulation Software: A Panel Discussion" Proceedings of the 1998 Winter Simulation Conference; p. 1681-1687.

El-khoury, Jad, "Model Data Management—Towards a common solution for PDM/SCM systems" SCM 2005, Sep. 5-6, 2005, Lisbon, Portugal, 2005 ACM; p. 17-32.

* cited by examiner

*Primary Examiner* — Lee D Wilson
*Assistant Examiner* — Alvin Grant
(74) *Attorney, Agent, or Firm* — Zilka-Kotab, PC (57) ABSTRACT

According to one embodiment, an apparatus for tilting objects includes a lower portion which comprises at least one foot plate and at least three supporting walls. A height of the top of the lower portion is about the height of a supporting structure. The apparatus also includes an upper portion which comprises a substantially flat surface and at least one connector for coupling a node carrier to the upper portion. The upper portion is coupled to the lower portion, and the upper portion tilts relative to the lower portion between an angle about horizontal to an angle about vertical.

12 Claims, 6 Drawing Sheets

HINGED BASE FOR POSITIONING HEAVY COMPONENTS

BACKGROUND

The present invention relates to movement and placement of heavy components, and more particularly, this invention relates to uprighting and positioning servers at customer sites.

Generally, when a heavy or bulky component is shipped to a location, such as a customer site, the component is packaged with the longest side of the component resting horizontally on a shipping pallet. In some instances, a user at the location, such as a customer engineer, must change the orientation of the component to a vertical position before attempting to install the component into other systems resident at the location.

When the weight of the component significantly exceeds a specified limit for a single person lift (for example, about 39.7 lb) then a situation exists where a user could potentially injure himself or damage the component when trying to place the component into the proper vertical position. Known solutions to this problem have largely been limited to providing a good hand hold (or multiple hand holds) on the component and ensuring that the product packaging is designed to allow adequate access to the component. However, this approach does not recognize human limitations and requires a level of strength, coordination, and balance that many individuals may not possess, and therefore is not an acceptable solution for many users. For example, in some instances, the heavy component to be lifted may weigh more than the user who is trying to lift it.

It is apparent that a new approach is needed, an approach that gives the user some sort of mechanical advantage to aid in the lifting of the heavy component.

SUMMARY

According to one embodiment, an apparatus for tilting objects includes a lower portion which comprises at least one foot plate and at least three supporting walls. A height of the top of the lower portion is about the height of a supporting structure. The apparatus also includes an upper portion which comprises a substantially flat surface and at least one connector for coupling a node carrier to the upper portion. The upper portion is coupled to the lower portion, and the upper portion tilts relative to the lower portion between an angle about horizontal to an angle about vertical.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that; as used in the specification and the appended claims, the singular forms "a," "an" and "the" include plural referents unless otherwise specified.

The following description discloses several preferred embodiments of an apparatus for tilting heavy components, as well as operation and/or component parts thereof.

In one general embodiment, an apparatus for tilting objects comprises a lower portion including at least one foot plate; at least three supporting walls wherein a height of the top of the lower portion is about the height of a supporting structure; and an upper portion including a substantially flat surface; and at least one connector for coupling a node carrier to the upper portion, wherein the upper portion is coupled to the lower portion, wherein the upper portion tilts relative to the lower portion between an angle about horizontal to an angle about vertical.

In another general embodiment, an apparatus for tilting objects comprises: a lower portion, including two foot plates; four supporting walls; and two cutouts for foot plates in one of the supporting walls opposite the hinge, wherein a height of the top of the lower portion is about the height of a supporting structure. The apparatus also comprises an upper portion, including: a first substantially flat surface; four holes for mounting a node carrier; and a hinge coupling the upper portion and the lower portion, wherein the upper portion tilts relative to the lower portion between an angle about horizontal to an angle about vertical. In addition, the apparatus comprises a node carrier, including: a second substantially flat surface; a first member and a second member extending from the second flat surface at an angle about normal to a plane of the second flat surface for holding a component, wherein the first member extends from the second flat surface near an end opposite from where the second member extends from the second flat surface, wherein the second member is on a side of the second flat surface closest to the coupling between the lower portion and the upper portion; and at least one connector for coupling the second flat surface to the upper portion, wherein the second flat surface is coupled to the upper portion. Further, the apparatus comprises a strap including two handles, wherein the strap is coupled to the node carrier for effecting a tilting of the node carrier and upper portion from about horizontal to about vertical.

According to some embodiments, a base unit may enable a user to safely move a heavy system component from a horizontal position to a vertical position. In particularly preferred, but not all, embodiments, there are generally three systems working together to move the system component: a receiver base, which may include cutouts to allow the placement of at least one foot on the bottom edge of the receiver base to hold the receiver base in position while performing the lifting task; a strap for lifting the component; and a node carrier for engaging the system component.

In some embodiments, the receiver base incorporates cutouts to allow a user to place his left and/or right foot onto the lower portion of the receiver base to steady it. This placement of the foot holds encourages the user to take an active stance (legs apart, knees bent, trunk flexed) and allows him to use major muscle groups and his own body mass to move the system component.

An apparatus for tilting objects may be described with reference to FIGS. 1-8. The apparatus may be comprised of at least one of a receiver base, a node carrier, and a strap. In some embodiments, the apparatus for tilting objects may be comprised of all three elements, but is not so limited.

Figure 1:
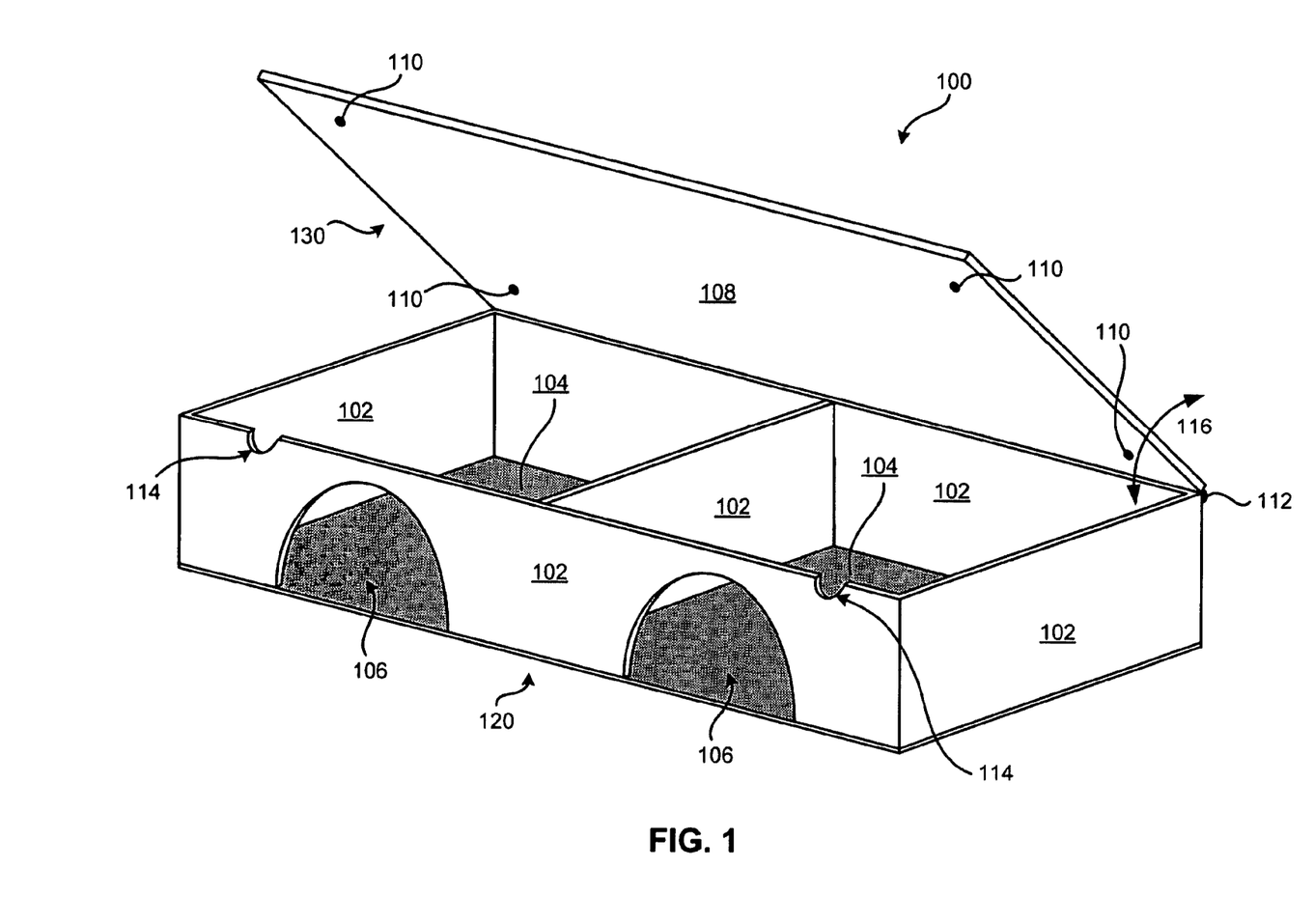
FIG. 1 is a schematic diagram of a base unit for tilting objects according to one embodiment.

With reference to FIG. 1, an apparatus for tilting a heavy component is described according to one embodiment. The apparatus includes a receiver base 100, which is shown in FIG. 1. The receiver base 100 includes a lower portion 120, comprising at least one foot plate 104 and at least three supporting walls 102. A height of the top of the lower portion 120 is about the height of a supporting structure (806, FIG. 8). As shown in FIG. 1, the foot plate 104 may also comprise a bottom of the receiver base 100.

In addition, the receiver base 100 includes an upper portion 130, comprising a substantially flat surface 108 and at least one connector 110 for coupling a node carrier (300, FIG. 3A) to the upper portion 130. The upper portion 130 is coupled to the lower portion 120, and the upper portion 130 tilts relative to the lower portion 120 between an angle about horizontal to an angle about vertical, as indicated by the arrow 116.

Figure 2:
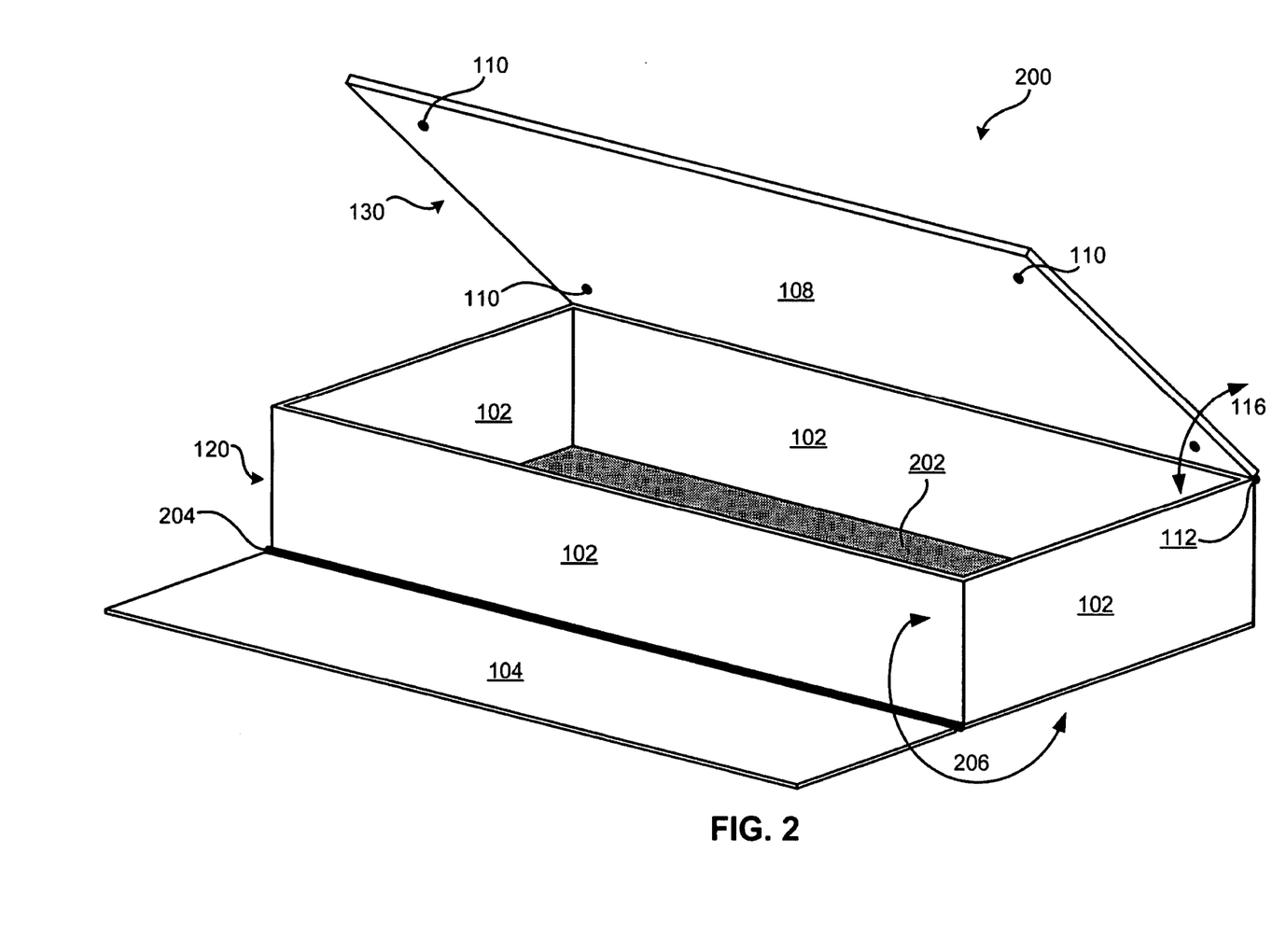
FIG. 2 is a schematic diagram of a base unit for tilting objects according to one embodiment.

In some embodiments, the lower portion 120 may comprise four supporting walls 102, as shown in FIG. 2. Of course, more supporting walls may be included in the receiver base, such as to support additional weight, for ease of construction, for increased stability, etc. In FIG. 1, the receiver base includes five supporting walls 102.

In some embodiments, the lower portion 120 may include two foot plate cutouts 106 in one of the supporting walls 102. Of course, more or less foot plate cutouts 106 may be included, such as one foot plate cutout 106, four foot plate cutouts 106, etc.

In some more embodiments, the upper portion 130 may be coupled to the lower portion 120 with a piano-style hinge 112, as shown in FIG. 1. The upper portion 130 may be coupled to the lower portion 120 in many other ways, such as with more than one hinge, with clamps, with a flexible material (such as cloth, nylon, elastic, rubber, plastic, etc.), etc.

In even more embodiments, the receiver base 100 may further comprise at least one cutout 114 for finger placement in one of the supporting walls 102. The finger cutouts 114 may be smaller than the foot cutouts 106, may be the same size, or may be larger. Also, the finger cutouts 114 may be positioned near an upper edge of the lower portion 120 for assisting in access to the underside of the upper portion 130.

In some embodiments, the at least one connector 110 for coupling the node carrier (300, FIG. 3A) to the upper portion 130 is at least one of: a hole, a groove, a fastener, and a bracket. Of course, more connectors 110 may be used, and any connectors 110 may be used together to couple the upper portion 130 with the node carrier (300, FIG. 3A). For example, two grooves may be used to slide the node carrier onto the upper portion, and then four fasteners may be used with holes in the flat surface of the upper portion for securely coupling the upper portion to the node carrier.

Now referring to FIG. 2, a receiver base 200 (which may be included in an apparatus for tilting objects) is shown according to another embodiment. As shown in FIG. 2, the at least one foot plate 104 is adjustably coupled to a main body of the lower portion 120. Also, the upper portion 130 is adjustably coupled to an opposite end of the main body of the lower portion 120. Both the foot plate 104 and the upper portion 130 are coupled to the main body of the lower portion 120 by piano-style hinges 112, 204, respectively. In addition, the at least one foot plate 104 is adjustable between an angle parallel to one of the supporting walls 102 to an angle about perpendicular to the supporting wall 102 about the hinge 204, as shown by arrow 206.

In some embodiments, the receiver base 200 may include a bottom portion 202, as shown in FIG. 2. Of course, this bottom portion 202 may also comprise at least one of the foot plates 104, as shown in FIG. 1.

Figure 3A:
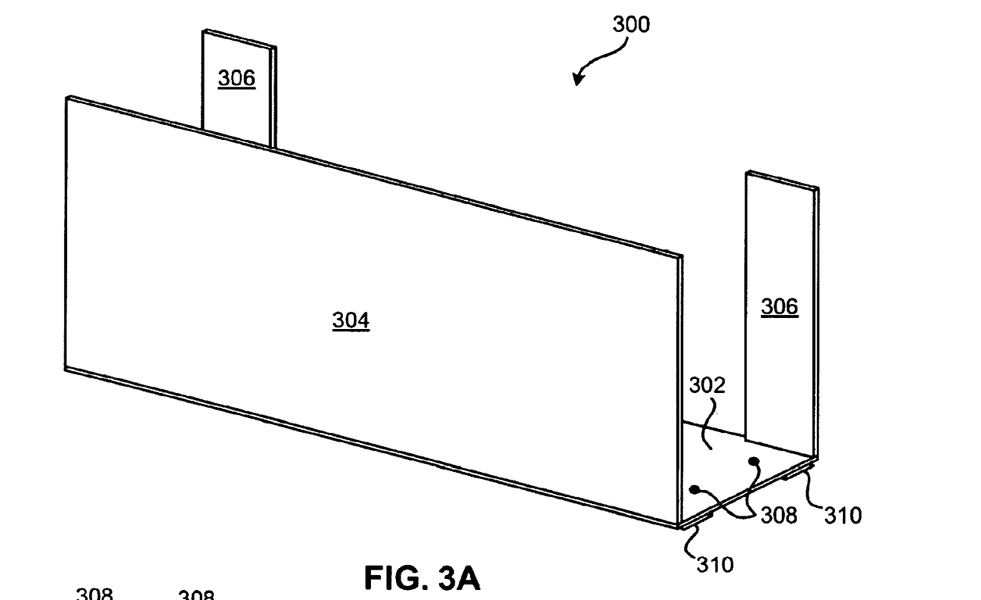
FIG. 3A is a schematic diagram of a node carrier according to one embodiment.
Figure 3B:
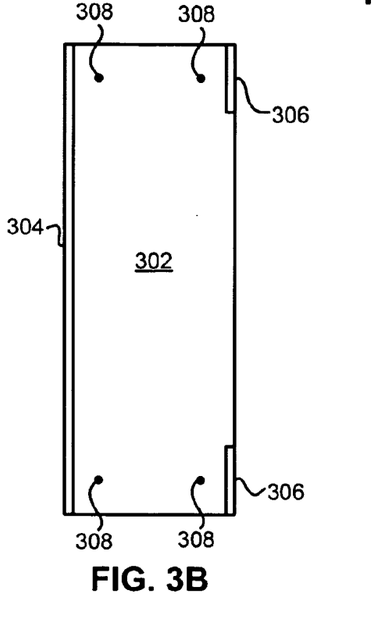
FIG. 3B is a top view of a node carrier according to one embodiment.
Figure 3C:
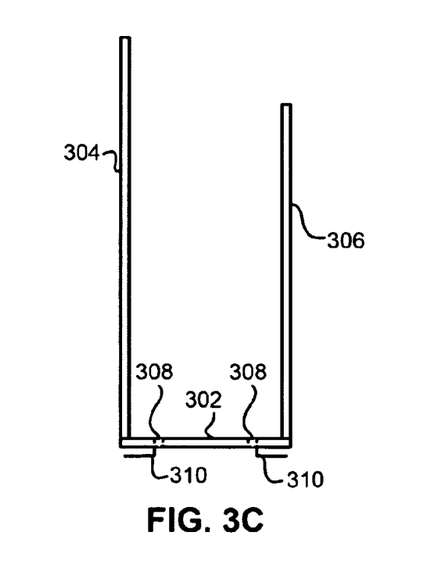
FIG. 3C is a side view of a node carrier according to one embodiment.

Now referring to FIG. 3A-3C, a node carrier 300 is described according to one embodiment. FIG. 3A is a perspective view of a node carrier according to one embodiment, while FIG. 3B is a top view and FIG. 3C is a side view. The apparatus for tilting objects may further comprise the node carrier 300 according to some preferred embodiments.

Figure 4:
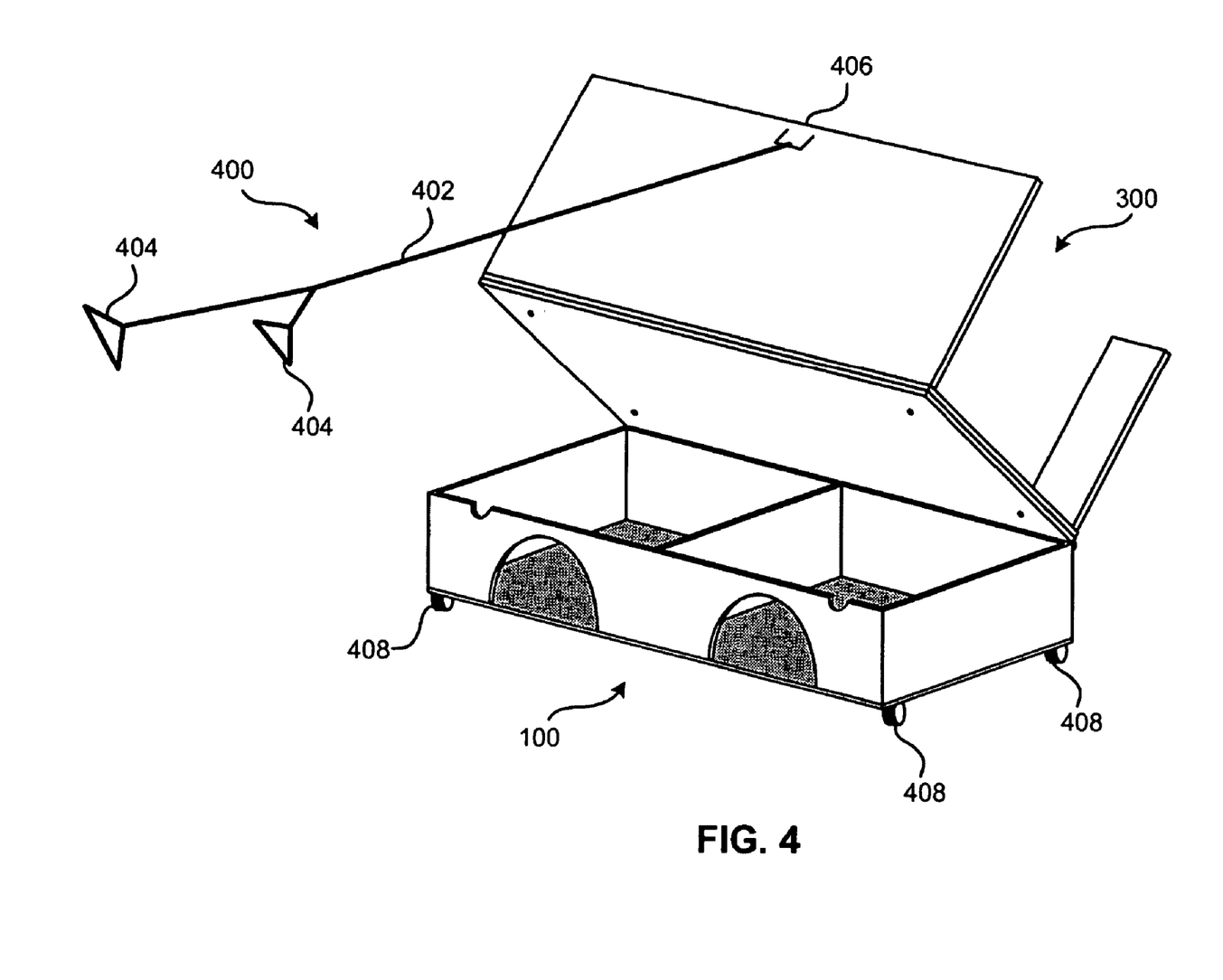
FIG. 4 is a schematic diagram of an apparatus for tilting objects including a base unit, node carrier, and strap according to one embodiment.

The node carrier 300 comprises a substantially flat surface 302, and a first member 304 and a second member 306 extending from the flat surface 302 at an angle about normal to a plane of the flat surface 302 for holding a heavy component. The first member 304 extends from the flat surface 302 near an end opposite from where the second member 306 extends from the flat surface 302. Also, the second member 306 is on a side of the flat surface 306 closest to the coupling between the lower portion and the upper portion (as shown in FIG. 4 and described in detail below). The node carrier 300 also includes at least one connector 308 for coupling the flat surface 302 to the upper portion (130, FIG. 1). In addition, the flat surface 302 is coupled to the upper portion (130, FIG. 1).

In some embodiments, the node carrier 300 may comprise a grooved device 310 for removably coupling with the upper portion (130, FIG. 1) of the apparatus (100, FIG. 4). The grooved device 310 may engage with a complementary grooved device coupled to the upper portion (130, FIG. 1). In one embodiment, the grooved devices may slide together to form a secure coupling between the upper portion (130, FIG. 1) and the node carrier 300.

In some more embodiments, the node carrier 300 may further comprise an adjustable element coupling the first member 304 to the flat surface 302 for adjusting the position of the first member 304 relative to the position of the second member 306. This embodiment is particularly useful for lifting objects which do not have a dimension that fits into the space between the first member 304 and the second member 306. For example, a server may be skinnier (less wide) than the distance between the first member 304 and the second member 306. In this example, the first member 304 can be moved closer to the second member 306 for securely engaging the server.

In even more embodiments, the at least one connector 308 for coupling the node carrier 300 to the upper portion (130, FIG. 1) is at least one of: a hole, a groove, a fastener, and a bracket. FIGS. 3A and 3C show a connector 308 that can be a hole and a fastener and a connector 310 which may be a groove. Of course, other types of connectors may also be used to couple the node carrier 300 to the upper portion (130, FIG. 1).

In some embodiments, the first member 304 and the second member 306 may be the same height, or may be different heights, as shown in FIG. 3C.

With reference to FIG. 4, an apparatus is shown including a base unit 100, a node carrier 300, and a strap 400. The strap comprises two handles 404, wherein the strap is coupled to the node carrier 300 via portion 402 for effecting a tilting of the node carrier 300 from about horizontal to about vertical. Portion 402 may be coupled to the node carrier via a connector 406, which may be a bracket, D-ring, clamp, hole, or any other connector as would be known to one of skill in the relevant art. The node carrier 300 is shown tilted at an angle about half way between horizontal and vertical. The handles 404 may be positioned anywhere along the strap 400, and are not limited to the positions shown in FIG. 4. The strap 400 may be comprised of any material giving the strength required to upright objects, such as CORDURA nylon, rope, chain, etc.

In some embodiments, the apparatus may further comprise wheels 408 located on the bottom of the lower portion of the receiver base 100. The wheels 408 may be formed of any material and be of any style as would be known to one of skill in the relevant art. The wheels 408 may also be of a locking type, such that when the apparatus is positioned relative to the heavy component to be lifted, it will not move on the wheels 408 during the lifting process.

Figure 5A:
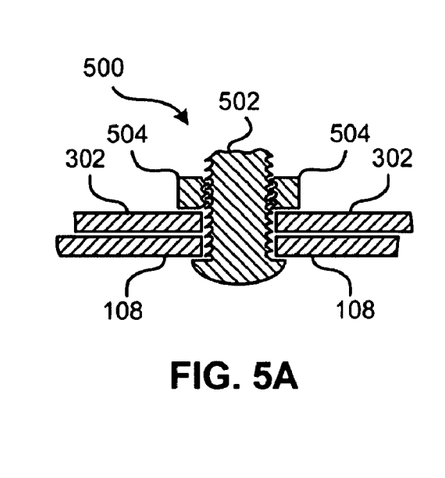
FIG. 5A is a cross section of a fastener according to one embodiment.
Figure 5B:
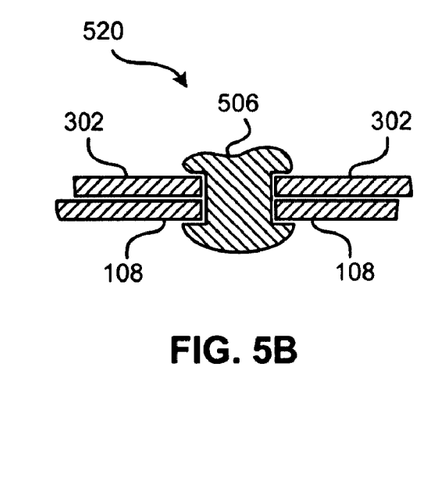
FIG. 5B is a cross section of a fastener according to one embodiment.

Now referring to FIGS. 5A-5F, connectors are shown according to several embodiments. The connectors may be used to couple the upper portion 108 of the receiver base to the flat surface 302 of the node carrier. In FIG. 5A, a connector 510 is shown where a hole is positioned on the upper portion 108 and the flat surface 302 such that a bolt 502 and a nut 504 may be used to couple the surfaces together. Of course, any other fastener may be used to couple the two surfaces together with the holes, such as a rivet 506, as shown in FIG. 5B. Other exemplary fasteners include brads, screws, nails, etc. Of course, the fastener may be inserted from the opposite direction with the same coupling effect.

Figure 5C:
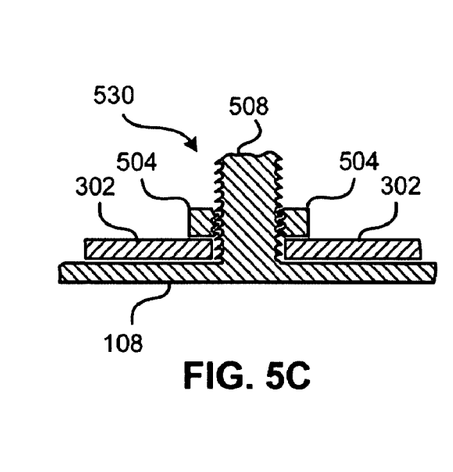
FIG. 5C is a cross section of a fastener according to one embodiment.
Figure 5D:
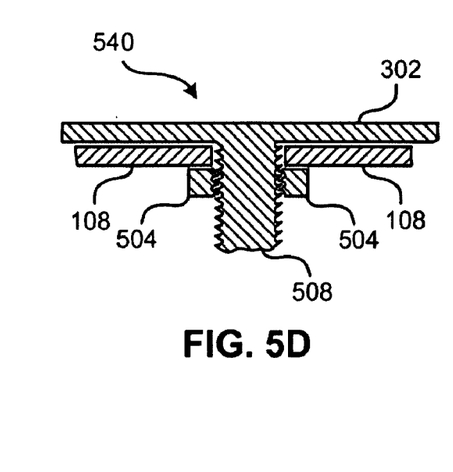
FIG. 5D is a cross section of a fastener according to one embodiment.

In FIGS. 5C and 5D, another connector is shown where a member 508 extends from one surface (either the upper portion 108 of the receiver base or the flat surface 302 of the node carrier) and a nut 504 is used to couple the surfaces together. Of course, other fasteners may be used in these embodiments, such that a member extends from one surface and fits into a hole on the other surface, and is then secured in place, such as with a nut, pin, clamp, etc.

Figure 5E:
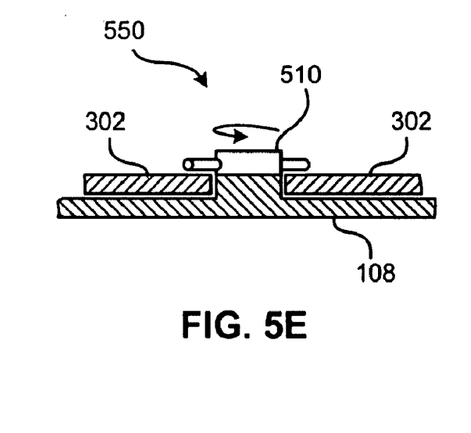
FIG. 5E is a schematic diagram of a fastener according to one embodiment.
Figure 5F:
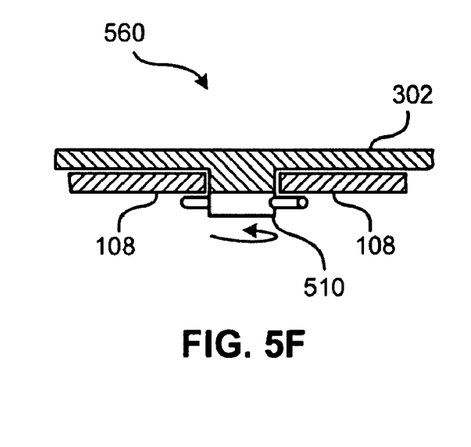
FIG. 5F is a schematic diagram of a fastener according to one embodiment.

In FIGS. 5E and 5F, another connector is shown where a member 510 extends from one surface (either the upper portion 108 of the receiver base or the flat surface 302 of the node carrier) and is formed such that it can be effect the coupling without any additional hardware. For example, as shown in FIGS. 5E and 5F, the member 510 has an extended portion, which when rotated, locks against the other surface effecting the coupling. Of course, in such embodiments, the hole in the other surface is formed such that the extended portion can fit through the hole in one orientation, but not in another orientation.

Figure 6:
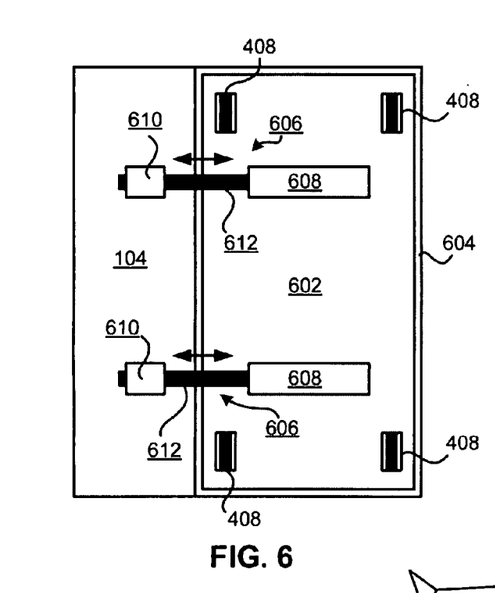
FIG. 6 is a schematic diagram of the bottom of a base unit according to one embodiment.

FIG. 6 is a simplified view of the bottom of the apparatus according to one embodiment. In this view, a foot plate 104 is coupled with the lower portion, possibly by a hinge. To compensate for natural movement of the individual pieces of the apparatus during lifting, one or more locking mechanism 606 may be used to secure the foot plate 104 during lifting. In one embodiment, the locking mechanism may be comprised of a sleeve 608 on the bottom portion 602 of the lower portion and a sleeve 610 on the foot plate 104, with a sliding member 612 extendable between the two sleeves. Also shown in FIG. 6, wheels 408 may be located near the corners of the bottom portion 602, and a edging 604 may extend around the outside of the bottom portion 602 so as to provide more support to the apparatus.

According to some embodiments, a foot plate 104 may slide out of a sleeve on the bottom portion 602 of the lower portion. This allows a user to use the foot plate for support and stability when tilting objects, and does not require a separate hinge to attach the foot plate, or cutouts for access to the footplate inside of the supporting walls.

Figure 7:
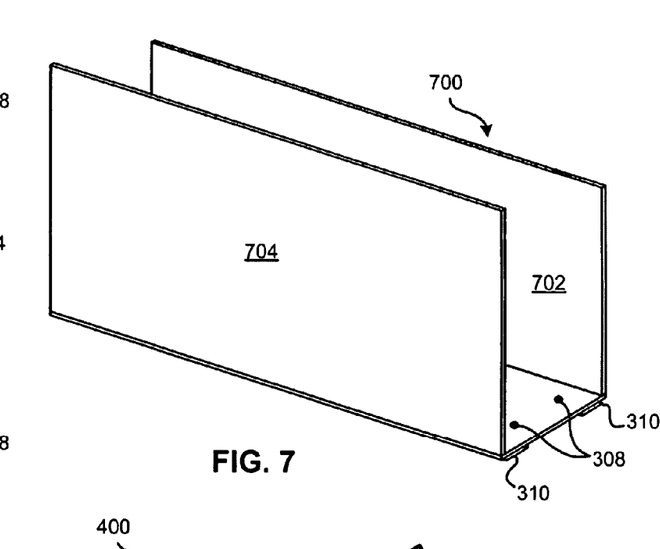
FIG. 7 is a schematic diagram of a node carrier according to one embodiment.

FIG. 7 is a node carrier 700 according to one embodiment. In this embodiment, the node carrier 700 includes a first member 704 and a second member 702 which may be of the same shape and size, or may be sized differently. In addition, in some preferred embodiments, the second member 702 may be adapted to fit under a component laying on its side on a supporting structure, as shown in FIG. 8.

Figure 8:
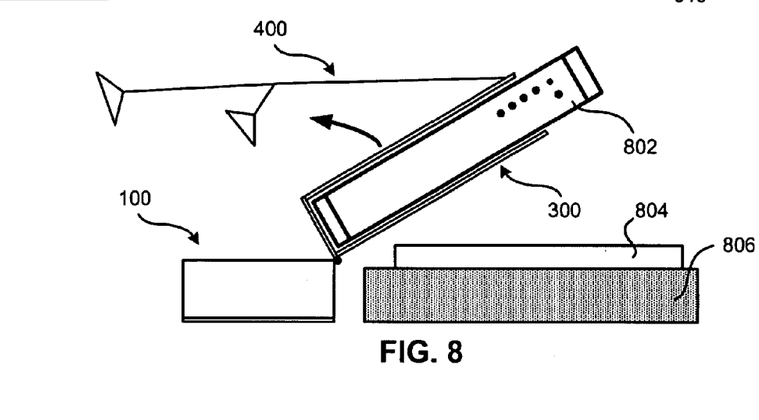
FIG. 8 is a schematic diagram of an apparatus to tilt an object including a base unit, node carrier, and strap according to one embodiment.

In FIG. 8, a heavy component 802 is being tilted with the aid of the apparatus according to one embodiment. The apparatus includes a receiver base 100, a node carrier 300 coupled to the receiver base 100, and a strap 400 coupled to the node carrier 300. The heavy component 802 is being tilted from a support structure 806. As shown, the top end of the upper portion of the receiver base 100 is about the same height as the top of the support structure 806. Some examples of support structures 806 include a pallet, a box, a carton, a crate, a housing, etc. As mentioned earlier, the second member of the node carrier 300 may be adapted so as to fit under the heavy component 802 laying on its side, without altering the supporting structure 806 and/or some of the packing materials 804 which may be included in the supporting structure 806. For example, the node carrier 300 may be designed to fit into grooves provided in the packing material 804 such that it can easily slip into the grooves and under the heavy component 802 as it lies on its side.

Generally, the heavy component 802 may be shipped in a fully enclosed container. This embodiment does not limit the ability to remove the upper portions of this container prior to tilting the heavy component 802.

In some embodiments, a heavy component may include an electrical component, such as a server, a power supply, a router, etc.

It will be clear that the various features of the foregoing methodologies may be combined in any way, creating a plurality of combinations from the descriptions presented above.

Also, a method for tilting a heavy component comprises sliding an about horizontally oriented node carrier adjacent the heavy component. This may allow for the heavy component to be coupled to the node carrier, possibly by use of straps, tie-downs, brackets, etc. The method also includes placing at least one foot on a foot plate, for stabilizing the receiver base, and pulling a strap to pivot the node carrier and the heavy component into an about vertical orientation.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus for tilting objects, comprising:
    a lower portion, comprising:
        at least one foot plate;
        at least three supporting walls,
        wherein a height of the top of the lower portion is about the height of a supporting structure; and
    an upper portion, comprising:
        a substantially flat surface;
        at least one connector for coupling a node carrier to the upper portion;
        wherein the upper portion is coupled to the lower portion,
        wherein the upper portion tilts relative to the lower portion between an angle about horizontal to an angle about vertical; and
    a node carrier comprising:
        a substantially flat surface;
        a first member and a second member extending from the flat surface at an angle about normal to a plane of the flat surface for holding a component,
        wherein the first member extends from the flat surface near an end opposite from where the second member extends from the flat surface,
        wherein the second member is on a side of the flat surface closest to the coupling between the lower portion and the upper portion; and
        at least one connector for coupling the flat surface to the upper portion,
        wherein the flat surface is coupled to the upper portion.

2. An apparatus as recited in claim 1, wherein the lower portion comprises four supporting walls.

3. An apparatus as recited in claim 1, wherein the lower portion includes two foot plate cutouts in one of the supporting walls.

4. An apparatus as recited in claim 1, wherein the upper portion is coupled to the lower portion with a piano-style hinge.

5. An apparatus as recited in claim 1, further comprising at least one cutout for finger placement in one of the supporting walls.

6. An apparatus as recited in claim 1, wherein the at least one connector for coupling the node carrier to the upper portion is at least one of a hole, a groove, a fastener, and a bracket.

7. An apparatus as recited in claim 1, wherein the at least one foot plate and upper portion are adjustably coupled to opposite ends of a main body of the lower portion by piano-style hinges,
    wherein the at least one foot plate is adjustable between an angle parallel to one of the supporting walls to an angle about perpendicular to the supporting wall about the hinge.

8. An apparatus as recited in claim 1, wherein the second member is adapted to fit under a component laying on its side on a supporting structure.

9. An apparatus as recited in claim 1, further comprising an adjustable element coupling the first member to the flat surface for adjusting the position of the first member relative to the position of the second member.

10. An apparatus as recited in claim 1, further comprising a strap comprising two handles, wherein the strap is coupled to the node carrier for effecting a tilting of the node carrier from about horizontal to about vertical.

11. An apparatus as recited in claim 1, wherein the at least one connector for coupling the node carrier to the upper portion is at least one of a hole, a groove, a fastener, and a bracket.

12. An apparatus as recited in claim 1, further comprising wheels located on the bottom of the lower portion.

* * * * *